United States Patent

Barnes

[15] 3,640,146
[45] Feb. 8, 1972

[54] HYDRAULIC SAFETY OVERRIDE VALVE

[72] Inventor: Randolph C. Barnes, Peoria, Ill.
[73] Assignee: Caterpillar Tractor Co., Peoria, Ill.
[22] Filed: May 28, 1970
[21] Appl. No.: 41,202

[52] U.S. Cl. ................................74/364, 74/753, 91/360, 92/131, 137/624.27, 192/87.19
[51] Int. Cl. ..................F16h 5/12, F15b 20/00, F16d 25/00
[58] Field of Search ..........................192/87.19, 133; 91/360; 92/131, 75; 137/624.27; 74/753, 364

[56] References Cited

UNITED STATES PATENTS

| 3,352,394 | 11/1967 | Longshore | 192/87.19 |
| 2,488,540 | 11/1949 | Hollingsworth | 74/364 X |
| 2,491,087 | 12/1949 | Cardwell et al. | 74/364 |
| 2,527,727 | 10/1950 | Hobbs | 92/131 X |
| 2,753,024 | 7/1956 | Weaving et al. | 74/364 X |
| 3,106,135 | 10/1963 | McAfee, Jr. et al. | 92/131 X |
| 3,243,025 | 3/1966 | Staab et al. | 192/87.19 |

Primary Examiner—Carlton R. Croyle
Assistant Examiner—Thomas C. Perry
Attorney—Fryer, Tjensvold, Feix, Phillips & Lempio

[57] ABSTRACT

A hydraulic control valve for controlling a vehicle transmission comprising a manually actuable position selector valve for alternatively directing hydraulic fluid to first or second position clutches of the transmission from a neutral position, a pressure modulating relief valve for modulating the operation of the position selector valve, and a safety override valve linked to the position selector valve for automatically returning the position selector valve to the neutral position when hydraulic pressure is low thereby avoiding system damage.

9 Claims, 1 Drawing Figure

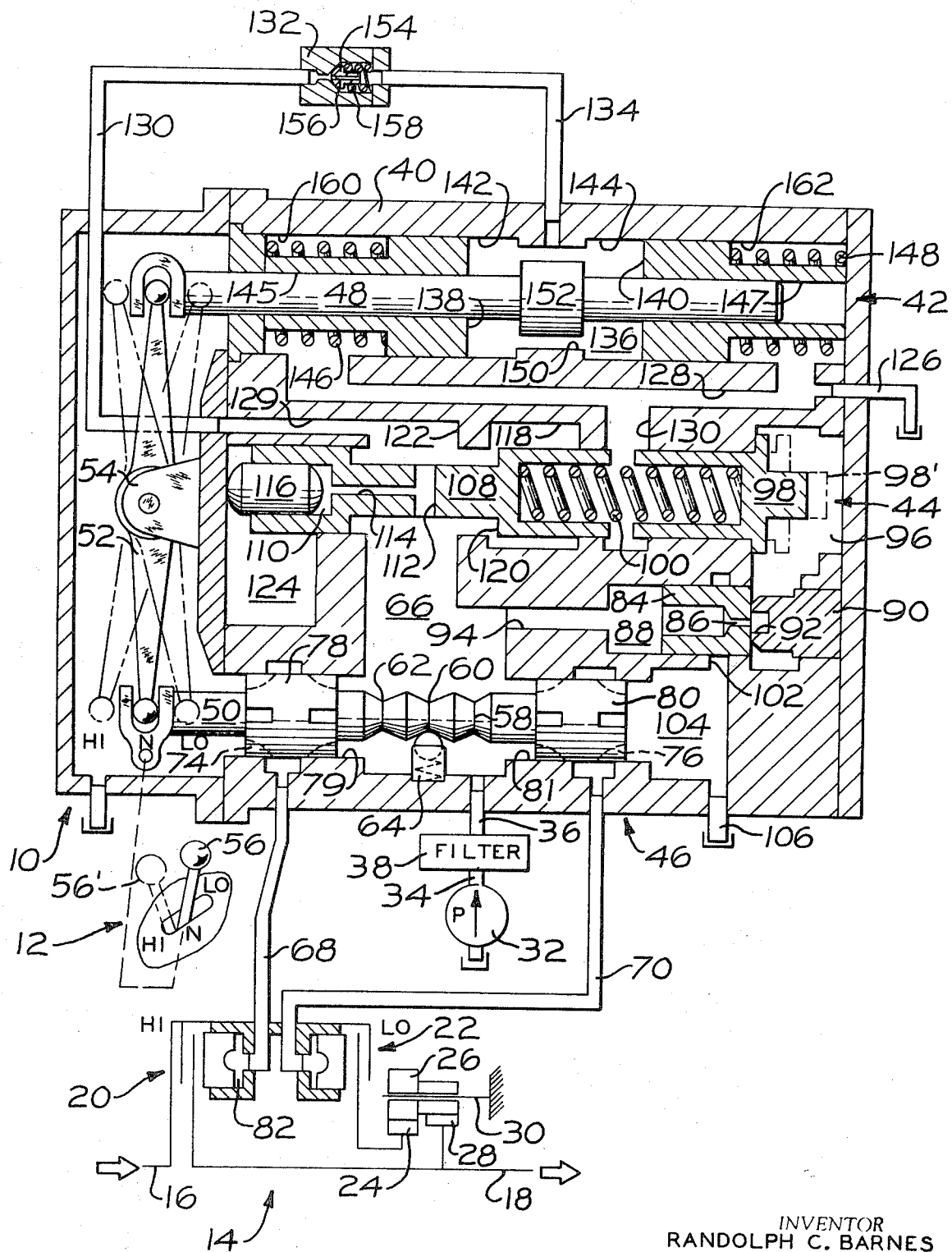

HYDRAULIC SAFETY OVERRIDE VALVE

BACKGROUND OF THE INVENTION

This invention is directed to a hydraulic control valve or means having control linkage for effecting shifting of a vehicle transmission of the two-position type in which shifting is accomplished by hydraulic pressure applied to control clutches in the transmission unit. The control valve includes a safety override valve which returns the control linkage of the control valve to a neutral position when hydraulic pressure is low, such as during hydraulic valve malfunction or normal shutdown of the hydraulic pressure power source which supplies the system hydraulic pressure.

This invention is applicable for use with a transmission of the two-position type such as a forward-reverse or a high-low unit. With the forward-reverse unit, the first position of the transmission corresponds to a forward gear while the second position corresponds to a reverse gear. Similarly, with the high-low transmission or gear reduction unit, the first position corresponds to a high-speed gear while the second corresponds to a low-speed gear. In the following discussion, the high-low gear reduction unit is discussed. This is not to be taken as limiting the scope of the invention narrowly to a high-low transmission. Rather, the invention is broadly directed to a control valve for use with a two position transmission. Therefore, the following discussion of the invention in association with a high-low gear reduction unit is by way of example only.

This invention is particularly directed to application on agricultural track-type tractors. Such tractors have the inherent problem of having to negotiate difficult terrain in their normal working environment. In so doing, it is a common practice for operators to shift down into a lower speed range for a short period of time in order to transfer more torque to the vehicle drive line.

High-low ratio gear reduction units have proved to be advantageous in this application. Such units allow shifting down into the low speed range by hydraulic means. In order to effect such down-shifting, control means must be provided to enable direction of hydraulic fluid under pressure to actuation means such as clutches, thereby alternatively engaging either high or low speed ranges. The use of such a high-low gear reduction unit enables the utilization of a "straight-shift" control means having control linkage whereby shifting from high to low through a neutral position may occur in a straight line. This shift pattern is advantageous for many reasons including the fact that it requires a minimum of operator effort to accomplish shifting. Thus, the provision of a speed selector valve which will accommodate a straight-shift pattern in order to control a high-low gear reduction unit is the first problem to be solved by this invention.

While the aforementioned speed selector valve or means is sufficient to control the application of actuation means on the gear reduction unit, such control would be impractically harsh. In order to reduce the problem of harsh application of the actuation means or clutches on the gear reduction unit, an additional modulating valve or means is provided. Such modulating means or valve functions to modulate the application of the actuation means on the gear reduction unit in order to insure smoothness of operation of the unit.

Furthermore, it is now the practice in industry to provide safety devices which prevent a tractor from being started unless the control means or system is in a neutral position in order to avoid damage as previously mentioned. However, previous systems such as that disclosed in U.S. Pat. No. 3,091,976, assigned to the assignee of this invention, have been concerned with a U-shaped shift pattern which requires return of the control system linkage to neutral from only one direction. The use of a straight-shift control means as described above, on the other hand, requires the return of the control linkage to a central, neutral position from either of two directions. A problem thus posed is to provide a safety override system which will function in this manner and return the control linkage to the neutral position from either of two positions.

A solution to the above outlined problems is the subject of this invention. The solution takes the form of a control valve or means comprising a speed selector valve means, a pressure modulating relief valve means, and a safety valve means.

It is therefore an object of this invention to provide a control means in the form of a control valve for selectively directing hydraulic fluid to a plurality of actuation means or clutches which, in turn control a plurality of speeds or power transfer modes of a gear reduction unit.

It is a further object of this invention to provide a control means for a hydraulically actuable gear reduction unit which has means for modulating the application of actuation means or clutches on the gear reduction unit.

It is a further object of this invention to provide a control means for a hydraulically actuable gear reduction unit having a safety override means which will return the control means to a neutral position in response to low hydraulic pressure.

It is a still further object of this invention to provide a control means for a hydraulically actuable gear reduction unit having a safety override means which will return the control means to a neutral position in response to low hydraulic pressure while being insensitive to short pressure transients caused by shifting.

It is a still further object of this invention to provide a control means for a hydraulically actuable gear reduction unit having a safety override means which will return the control means to a neutral position from either of two directions in response to low hydraulic pressure.

BRIEF DESCRIPTION OF THE DRAWING

The FIGURE discloses a cross-sectional view of the hydraulic control valve of this invention in association with a system including a hydraulic gear reduction unit which is controlled by the control valve.

DETAILED DESCRIPTION

Referring to the FIGURE, there is shown the arrangement of a control system including a control valve shown generally at 10 which is mechanically linked to a manual control lever shown generally at 12 and which controls a high-low "power shift" gear reduction unit shown generally at 14.

The gear reduction unit has an input member or shaft 16 which may be alternatively connected to an output member or shaft 18 through a high-range clutch or actuation means shown generally at 20 or for reduced speed through a low-range clutch or actuation means shown generally at 22. The low-range actuation means includes a sun gear 24, a stepped reducing gear 26, and a sun gear 28. The stepped reducing gear may be mounted for rotation by suitable bearing means (not shown) on a stationary shaft 30.

The system is powered by means of a source of fluid pressure comprising a pump 32 by means of lines 34, 36 through filter 38. The system is illustrated with the parts in the positions which they assume when the fluid power source or pump is in operation and the controls are in the neutral position. Located within a common housing 40 are a plurality of valves consisting of a safety valve or means 42, a pressure modulating relief valve or means 44, and a speed selector valve or means 46.

The safety valve includes a safety spool 48 which is mechanically linked to a speed spool 50 of the speed selector valve by means of a pivot lever 52 which has an end linked to each spool and is pivotally mounted on pivot mount 54 in order to provide coordinated axial movement of both spools. A shift lever 56 is mechanically linked to the pivot lever end of the speed spool. Speed spool 50 includes a high-range detent annulus 58, a neutral detent annulus 60, and a low range detent annulus 62. Speed spool 50 is maintained in the high, low, or neutral position by means of a spring-biased ball or detent means 64.

Operation of pump 32 introduces fluid under pressure into chamber 66 by means of lines 34, 36 through filter 38 as previously mentioned. The hydraulic fluid at a pressure of approximately 250 p.s.i. in chamber 66 is communicated to either high-speed clutch 20 or low-speed clutch 22 upon manual actuation of speed spool 50 by means of shift lever 56.

For example, when the operator selects a high speed driving mode he places lever 56 into position 56'. This causes speed spool 50 to be moved leftwardly, thus communicating the working fluid in chamber 66 with high-speed clutch 20 by means of line 68.

Conversely, if shift lever 56 is moved in the opposite direction, the working fluid in chamber 66 is communicated with low-speed clutch 22 by means of line 70. A plurality of axially oriented slots 74, 76 are machined on both edges of speed spool lands 78, 80, respectively. These slots permit gradual activation of the clutches by allowing finer control of the working fluid to the clutches when the spool lands are reciprocated in mating axial bores 79, 81. In this manner the operator may "inch" the vehicle by small, incremental movements of shift lever 56.

As cylinder 82 in high-speed clutch 20 is filled, pressure in chamber 66 drops to approximately 30 p.s.i. before it begins to rise again. At the beginning of the pressure rise, speed check valve 84 having orifice 86 extending therethrough is at its rightmost position in speed check valve chamber 88. In this position the speed check valve abuts against housing stop 90 having stop slot 92 therein.

As pressure in chamber 66 begins to rise, fluid meters through passage 94 and chamber 88 and thence through orifice 86 and stop slot 92 into chamber 96. This causes load piston 98 to move from approximately position 98' leftwardly to the position shown in the FIGURE where it abuts the housing. It should be further noted that the rightward limit of travel of load piston 98 is defined by the point at which it abuts the adjacent housing.

It should be parenthetically noted that load piston 98 assumed its position 98' due to a pressure drop in chamber 66 communicated to chamber 96 by the aforementioned passages which was caused by a previous speed shift. During the previous shift, the resultant pressure drop in chamber 66 quickly reduced pressure in chamber 96 by means of the aforementioned passages which permitted spring 100 to force load piston 98 into chamber 96 to position 98' and thereby to compress fluid in chamber 96 which, in turn, forced check valve 84 to move leftwardly in chamber 88 and thereby allow dumping of fluid from chamber 96 into an annulus 102 and thence into speed spool bore 104 and finally through a drain 106.

At any point above fill, the action of load piston 98 exerts a leftward force on modulating relief valve spool 108 by means of spring 100. Conversely, spool 108 exerts a rightward force on load piston 98 by means of the same spring.

Rising pressure in chamber 66 is also communicated to slug cavity 110 in one end of spool 108 by means of cross passage 112 and axial passage 114. The pressure fluid thus communicated urges spool 108 rightwardly as pressure in slug cavity 110 causes generally cylindrically shaped slug 116 to move leftwardly relative to the cavity while abutting against the valve housing. Pressure forces in chamber 96 distributed over the relatively large rightward end of load piston 98 are transmitted by means of spring 100 to modulating relief valve spool 108 to overcome the pressure forces on the smaller pressure area of slug 116 in cavity 110. The metering of fluid from chamber 66 to a drain (not shown) by means of a drain annulus 118 is decreased due to the leftward movement of spool land edge 120 toward land 122, whereupon pressure in chamber 66 rises to a pressure approaching the approximately 250 p.s.i. value which is required to lockup the clutches.

Clutch modulation is provided by the delay of pressure rise in chamber 66 from the time it takes to fill a given clutch completely through the time that it takes to fill chamber 96 and until spool 108 reduces fluid to drain through annulus 118 and thus stabilizes. Sufficient drain passages or chambers are provided to eliminate unwanted pressure influences on slug 116, spool 108, and load piston 98. For example, slug drain chamber 124 leads to a drain (not shown). Similarly, drain 126 facilitates draining of the spring ends of spool 108 and load piston 98 by means of passage 128 and annulus 130. Drain 126 also serves to drain the spring ends of safety spool 48, the operation of which will be hereinafter described.

The operation of safety valve 42 is as follows. Fluid from chamber 66 communicates through a passage 129 in the housing through a line 130 and a check valve 132 through line 134 into chamber 136. Fluid pressure in chamber 136 acts equally on identical safety piston 138, 140 which are axially movable in axial bores 142, 144 respectively. The leftmost piston 138 slidably encompasses the leftmost end of safety spool 48 by means of axial bore 145 while the rightmost piston 140 similarly slidably encompasses the rightmost end of spool 48 by means of axial bore 147. Two biasing compression springs or means 146, 148 are located in stepped portions of pistons 138, 140 respectively. These biasing compression springs which act between the housing and their respective pistons, possess spring constants such that when operating pressures are maintained in the system the pistons will take the position shown in the FIGURE wherein the spring ends abut the housing. However, when operating pressure drops for a period (2 seconds) in excess of the normal shift transient (0.6 second), the compression springs will force their respective pistons toward each other until they come to rest on the left and right land edges of central, annular land 150, and left and right edges of projecting land 152 on generally rodlike safety spool 48. In so doing, safety spool 48 will be centered, which movement will be transmitted through pivot lever 52 to center the neutral detent annulus 60 of speed spool 50 over detent means 64. Thus, the control valve will be automatically repositioned to a neutral position upon occurrence of a low operating pressure.

Check valve or means 132 is provided with a one-way check 154 having an orifice 156 therethrough and biased by a spring 158. The one-way check allows free passage of fluid from chamber 66 to safety valve chamber 136 and is calibrated to meter safety valve chamber fluid back to chamber 66 over a period of two seconds. The delay is sufficient to permit the normal shift cycle to occur without signaling the safety valve to commence its centering function. Safety valve spring chambers 160, and 162 are connected to drain 126 by means of passages to eliminate unwanted pressure influences as previously mentioned.

The sequence of events that takes place from one shift to another is as follows. Initially, the transmission control is positioned with lever 56 in neutral. When the vehicle engine is started, initiating flow from pump 32, the filling pressure in chamber 66 causes immediate rightward movement of check valve 84. Pressure in chamber 66 is also communicated to safety valve means 42 via conduit 130, check valve 132, and conduit 134 to chamber 136. Check valve 132 is provided with a poppet having an orifice which allows fast flow in the rightward direction. The pressurization of chamber 136 is such as to move safety piston 138 leftwardly and safety piston 140 rightwardly to their full limit of travel, thereby compressing springs 146 and 148, respectively.

As chambers 66 and 136 and associated passages are filled, a point is reached where the initial pressure setting of pressure-modulating relief valve means 44 is overcome. Until such a pressure is reached, spool 108 is disposed fully to the left against slug 116 such that spool land edge 120 blocks off communication between chamber 66 and drain 118. Pressure in chamber 66 is also communicated to chamber 96 and load piston 98 through orifice 86 in check valve 84. When the pressure in chamber 66 exceeds the initial pressure setting, spool 108 moves rightwardly to relieve and meter fluid to drain 118.

Thus, the pressure in chamber 66 acts through passages 112 and 114 against a slug 116 to urge the spool to the right. At the same time, pressure in chamber 96, distributed over the full cross-sectional area of load piston 98, urges spool 108 to the left by way of spring 100. The rate of flow across check valve 84 through orifice 86 determines the rate of rise of the pressure within chamber 66 to its maximum value. The maximum value is controlled by load piston 98 moving fully to the left against its stop (as shown). Pressure in excess of the maximum in chamber 66 dumps fluid to drain 118.

When the control lever 56 is shifted into high as at 56', speed spool 50 is manually moved to the left. This causes a drop in the pressure in chamber 66 because passage 68 and cylinder 82 must be filled to engage actuation means 20. This drop in pressure in chamber 66 causes a check valve 84 to move rapidly to the left, communicating chamber 96 to drain 106. Reducing the pressure in chamber 96 causes rapid rightward movement of load piston 98 to reset the modulating relief valve 44. The pressure in chamber 66 then drops to some low fill pressure value. At this low pressure value, modulating relief spool 108 moves to the left to block off communication of chamber 66 to drain 118.

During filling of cylinder 82, check valve 84 moves rightwardly again and the pressure in chamber 66 increases to the initial setting of the modulating relief valve. At this initial setting, the pressure acting against slub 116 causes rightward movement of spool 108 off its seat so that pressure in chamber 66 is relieved to drain 118. Load piston 98 begins its leftward movement from a rightward position such as 98' and proceeds to its fully leftward position, during which interval a gradual rate of pressure rise in chamber 66 and its actuating means 20 occurs to permit a smooth engagement of the clutches of the transmission.

During the period of filling of the clutch when chamber 66 is at a fairly low pressure, the higher pressure in chamber 136 drops slightly as some fluid travels from passage 134, through orifice 156, and into passage 130 as the pressures attempt to equalize. However, the duration of the low-pressure, clutch-filling period and initial portion of the pressure rise period is so short that orifice 156 does not permit enough fluid flow from chamber 136 to cause safety pistons 138 or 140 to abut land 152. Only when the delay in achieving a normal pressure in chamber 66 passes beyond the normal transient period does the flow quantity through orifice 156 allow the pistons to center the safety valve means 42 through springs 146 and 148.

It is understood that the foregoing description is merely illustrative of a preferred embodiment of the invention and that the scope of the invention is not to be limited thereto, but is to be determined by the scope of the appended claims.

What is claimed is:

1. In a transmission control system, a control valve comprising a housing, a position selector valve means within said housing for actuating a transmission, said position selector valve means having a first and a second position on opposite sides of a central, neutral position, said position selector valve means serving to direct pressure fluid from a source of fluid pressure to a transmission for actuation of corresponding first or second positions of said transmission, means for returning said position selector valve means to said central, neutral position when fluid pressure in said position selector valve means drops below a predetermined value for a predetermined time such as when malfunction or normal shutdown of the fluid power source occurs, thereby preventing system damage and wherein the means for returning the position selector valve means to the central, neutral position comprises safety valve means within said housing means operatively connecting said safety valve means to said position selector valve means, and means communicating said safety valve means with fluid pressure whereby movement of said safety valve means in response to low fluid pressure results in coordinate movement of said position selector valve means.

2. The invention of claim 1 further including a means which fluidly communicates the safety valve means with the position selector valve means and which operates to allow a normal shift cycle to occur without signaling the safety valve means to commence its centering function.

3. The invention of claim 2 further including a pressure modulating relief valve means within said housing which operates to modulate the operation of said position selector valve means.

4. The invention of claim 2 wherein the means which fluidly communicates the safety valve means comprises a one-way check having an orifice therethrough and a spring biasing said check.

5. The invention of claim 2 wherein the safety valve means further comprises a generally rodlike safety spool having a projecting land thereon, said safety spool being contained in said housing and being axially movably retained therein by identical safety pistons having axial bores encompassing opposite ends of said safety spool, said pistons being axially movable in separate axial bores in said housing, which bores are separated by a central, annular land, said pistons being biased toward each other by spring means contained within said housing bores, and said means operatively connecting said safety valve means comprises a pivot lever pivotally mounted intermediate its ends on a pivot mount and having one end operatively connected to one end of said safety spool and the other end operatively connected to said position selector valve means.

6. The invention of claim 5 wherein the spring means comprise springs having spring constants such that when operating pressures are maintained in the position selector valve means the fluid pressure communicated to the safety valve means will cause the pistons to compress the springs and allow free movement of the safety spool and when fluid pressure drops below a minimum value the springs will force the pistons against the center land and projecting land on the safety spool from opposite sides such that the safety spool will be centered and thereby center the position selector spool in the neutral position by means of the pivot lever.

7. The invention of claim 6 wherein the position selector valve means comprises a position spool having a pair of position spool lands thereon, said lands being axially movable within mating axial bores and wherein one end of said position spool is adapted for operative attachment with a shift lever.

8. The invention of claim 7 further including first, neutral and second position detent annuli on said position spool, and a detent means mounted to cooperate with said annuli in order to maintain a particular position.

9. The invention of claim 7 wherein said position spool lands define edges and wherein a plurality of axially oriented slots are extant on the edges thus defined thereby permitting finer control of the working fluid.

* * * * *